3,388,129
1-METHYL ERGOT ALKALOIDS
Albert Hofmann and Franz Troxler, Bottmingen, Basel-Land, Switzerland, assignors to Sandoz Ltd. (also known as Sandoz A.G.), Basel, Switzerland
No Drawing. Continuation-in-part of application Ser. No. 326,231, Nov. 26, 1963. This application Apr. 24, 1967, Ser. No. 632,911
Claims priority, application Switzerland, May 18, 1956, 33,377/56
The portion of the term of the patent subsequent to Nov. 16, 1982, has been disclaimed
2 Claims. (Cl. 260—285.5)

ABSTRACT OF THE DISCLOSURE

The compounds are of the class of lysergic acid compounds having an alkyl group at the indol-nitrogen atom, useful in the alleviation of allergic conditions.

The present application is a continuation-in-part of application Ser. No. 326,231, filed Nov. 26, 1963, now abandoned, which is a division of application Ser. No. 51,513, filed Aug. 24, 1960 and issued on Dec. 3, 1963 as U.S. Patent No. 3,113,133 which, in turn, is a continuation-in-part application of applications Ser. Nos. 658,505, 796,730 and 843,939 (all now abandoned), and relates to new compounds of the lysergic acid series which are alkylated at the indol-nitrogen atom. As will hereinafter be set forth in greater detail, these new compounds are useful particularly for therapeutic purposes in that they show benefit in the alleviation of allergic conditions.

Accordingly, the compounds herein are particularly useful to inhibit inflammatory action provoked by serotonin and to treat migraine by the administration of a daily dosage in animals of 0.05 to 10 mg. per kg. Especially valuable representative compounds are 1-methyl-dihydro-ergokryptine and 1-methyl-dihydro-ergocristine.

The new compounds of the present invention correspond to the formula

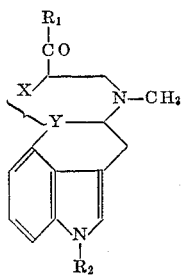

I wherein $R_1$ is the tripeptide radical of the natural ergot alkaloids, $R_2$ is lower alkyl, lower alkenyl or aralkyl, and $X\_Y$ stands for —$CH_2$—$CH<$ (dihydrolysergic acid derivatives) or for —$CH$=$C<$ (lysergic or isolysergic acid derivatives). They may be prepared by treating the corresponding compounds of the formula

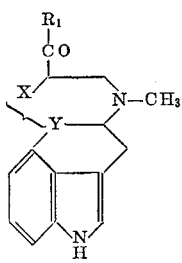

II wherein $R_1$ and $X\_Y$ have the afore-recited significances, in liquid ammonia, with alkali metal amide, and then reacting the resulting alkali salt in the same solvent with an organic halogen compound of the formula $R_2X$ wherein $R_2$ has the precedingly recited significance, and X is a halogen atom.

The possibilities of chemically altering the molecule of lysergic acid and its derivatives—the most important of which are the natural ergot alkaloids and their dihydro compounds—by substitution, are very limited. The chemical reactions involve great difficulties, which are ascribable to the tendency of the lysergic acid molecule to break down, to the sensitiveness of the said molecule to oxidizing agents and acid reagents and even to atmospheric oxygen and to light, and to the ease with which the said molecule isomerizes. In particular, it has not heretofore been possible to introduce additional alkyl groups into the lysergic acid molecule since, when conventional alkylating methods are employed with alkyl halides, quaternization of the nitrogen atom in the 6-position takes place very easily.

In accordance with the present invention, the lysergic acid derivatives of Formula II can be alkylated at the indol-nitrogen, by first reacting the said derivatives with an alkali metal amide in liquid ammonia, and then treating the resultant alkali salt in the same solvent with alkyl halide. The alkali metal amide is itself advantageously prepared in the reaction solution by dissolving an alkali metal, preferably sodium or potassium, in liquid ammonia, and then oxidizing the solution in per se known manner, e.g., by the addition of ferric nitrate. A lysergic acid derivative of Formula II and then, shortly after dissolution is completed, an alkyl halide, preferably methyl iodide, allyl or benzyl iodide, are added to the mixture. With derivatives of lysergic acid itself, the alkali metal amide as well as the alkyl halide are used only in slight—at most two-fold—excess in order to avoid side reactions, whereas with derivatives of dihydrolysergic acid a larger excess, e.g., up to the ten-fold quantity, may be employed. To work up the reaction mixture, ammonia is evaporated off and the residue is dissolved, with shaking, in a binary solvent system, e.g., ether-aqueous tartaric acid solution. The lysergic acid derivative alkylated at the indol-nitrogen is isolated according to methods which are per se known in colloid chemistry, and is finally purified, for example, by chromatography on aluminum oxide and/or recrystallization.

The so-obtained new derivatives of lysergic acid and dihydrolysergic acid are compounds of Formula I which are solid at room temperature (about 20 to 30° C.) and are for the most part crystalline. They give positive van Urk's and Keller's color reactions in shades which are distinctly different from the corresponding reactions of the starting materials.

The new compounds of Formula I are strongly active serotonin antagonists.

All of the new compounds of Formula I of the invention can be used therapeutically as serotonin antagonists, i.e., in combatting conditions of allergy and migraine.

They may be administered, for example, per os, intravenously or subcutaneously to animals in a daily dosage of 0.05 to 10 mg. per kg., and are active in doses of 0.1 mg.

The following examples set forth representative embodiments of the invention. In these examples, the parts are by weight unless otherwise indicated, and the relationship between parts by weight and parts by volume is the same as that between grams and milliliters. The temperatures are stated in degrees centigrade.

EXAMPLE 1

1-methyl-ergotamine and 1-methyl-ergotaminine 0.15 part of potassium are dissolved in 150 parts by volume of liquid ammonia; oxidation is carried out with ferric nitrate to produce potassium amide, and 1.16 parts of dry ergotamine are thereupon dissolved in the resultant mixture. After 15 minutes, 0.280 part of methyl iodide in 5 parts by volume of ether are added to the obtained yellow solution, after which the mixture is allowed to stand in air for 30 minutes. The liquid ammonia is then evaporated off and the dry residue is shaken out with a binary solvent, consisting of ether and aqueous tartaric acid. Sodium bicarbonate is added to the aqueous phase and the thus-liberated bases are taken up in chloroform, dried over sodium bicarbonate, and evaporated to dryness under reduced pressure. The residual crude base mixture is chromatographed in a column of 40 parts of aluminum oxide. 1-methyl-ergotamine and 1-methyl-ergotaminine are eluted with absolute chloroform, the first-named compound appearing first in the filtrate. The so-obtained 1-methyl-ergotamine crystallizes from methanol in the form of plates containing 1-mol of methanol of crystallization, the product having a melting point of 185°. $[\alpha]_D^{20} = -170°$ ($c=0.5$ in chloroform). Keller's color reaction: blue, less reddish than ergotamine. The obtained 1-methyl-ergotaminine crystallizes from methanol, in which solvent it is very difficultly soluble, in the form of spherical aggregates of short prisms, melting point 224°. $[\alpha]_D^{20} = +403°$ ($c=0.5$ in pyridine). Keller's color reaction: blue, like 1-methyl-ergotamine.

EXAMPLE 2

1-methyl-dihydro-ergokryptine

Potassium amide is prepared from 0.130 part of potassium in 80 parts by volume of liquid ammonia after the manner described in Example 1, whereupon 1 part of dihydro-ergokryptine is added and then, 5 minutes after complete dissolution is achieved, 0.45 part of methyl iodide in 5 parts by volume of ether are also added. The mixture is allowed to stand for 40 minutes in air, after which it is worked up in the manner described in Example 1. The so-obtained crude 1-methyl-dihydro-ergokryptine is crystallized from benzene, yielding plates which melt at 244–245°. $[\alpha]_D^{20} = -40°$ ($c+0.5$ in pyridine). Keller's color reaction: blue, less reddish and weaker than dihydro-ergokryptine.

EXAMPLE 3

1-methyl-dihydro-ergocristine 1-methyl-dihydro-ergocristine is prepared after the manner described in Examples 1 to 3. The product is obtained in the form of non-uniform plates which melt at 244–246° after recrystallization from benzene. $[\alpha]_D^{20} = -41°$ ($c=0.5$ in pyridine). Keller's color reaction: blue, less reddish and weaker than dihydro-ergocristine.

We claim:
1. 1-methyl-dihydro-ergokryptine.
2. 1-methyl-dihydro-ergocristine.

References Cited

UNITED STATES PATENTS 3,218,324   12/1965   Hofmann et al. ____ 260—285.5

FOREIGN PATENTS 811,964   4/1959   Great Britain.

NICHOLAS S. RIZZO, *Primary Examiner.*

ALEX MAZEL, D. DAUS, *Examiners.*